(12) United States Patent
Rhea et al.

(10) Patent No.: US 10,891,139 B1
(45) Date of Patent: Jan. 12, 2021

(54) PROVIDING FIRMWARE SPECIFIC INFORMATION VIA ACPI TABLES

(71) Applicant: American Megatrends International, LLC, Norcross, GA (US)

(72) Inventors: Paul Anthony Rhea, Lawrenceville, GA (US); Stefano Righi, Lawrenceville, GA (US); Oleksiy Yakovlev, Lawrenceville, GA (US)

(73) Assignee: American Megatrends International, LLC, Norcross, GA (US)

( * ) Notice: Subject to any disclaimer, the term of this patent is extended or adjusted under 35 U.S.C. 154(b) by 286 days.

(21) Appl. No.: 15/661,634

(22) Filed: Jul. 27, 2017

(51) Int. Cl.
*G06F 9/44* (2018.01)
*G06F 9/445* (2018.01)
*G06F 9/4401* (2018.01)
*G06F 21/62* (2013.01)

(52) U.S. Cl.
CPC ........ *G06F 9/44505* (2013.01); *G06F 9/4401* (2013.01); *G06F 21/629* (2013.01)

(58) Field of Classification Search
CPC .................. G06F 1/32; G06F 1/26; G06F 9/44
See application file for complete search history.

(56) References Cited

U.S. PATENT DOCUMENTS

| | | | |
|---|---|---|---|
| 9,395,968 B1* | 7/2016 | Nallagatla | G06F 8/654 |
| 2004/0128507 A1* | 7/2004 | McKenney | A63F 13/10 |
| | | | 713/170 |
| 2005/0144433 A1* | 6/2005 | Rothman | G06F 9/4401 |
| | | | 713/2 |
| 2006/0020834 A1* | 1/2006 | Qureshi | G06F 1/26 |
| | | | 713/300 |
| 2018/0260172 A1* | 9/2018 | Nakamura | H04L 67/34 |
| 2019/0026118 A1* | 1/2019 | Warkentin | G06F 9/4411 |

\* cited by examiner

*Primary Examiner* — Keshab R Pandey
(74) *Attorney, Agent, or Firm* — Newport IP, LLC

(57) ABSTRACT

Technologies are disclosed herein that allow for utilization of firmware specific data through an Advanced Configuration and Power Interface (ACPI) Firmware Identification (FID) table in a computing system. The ACPI FID table can be loaded during a boot of a computer system. The ACPI FID table can be read after an operating system has been loaded on the computer system. Based upon firmware specific data in the ACPI FID table, functionality provided by the application can be restricted. The use of various features provided by the application can be restricted or the application can be restricted from executing entirely. Compatibility between the application and the firmware can be ensured based upon firmware specific data in the ACPI FID table.

20 Claims, 5 Drawing Sheets

PROVIDING FIRMWARE SPECIFIC INFORMATION VIA ACPI TABLES

BACKGROUND

Computers can run on multiple types and versions of firmware. Many applications can execute across these different firmware versions without an issue. Some applications, however, encounter compatibility and reliability issues when executing over different firmware versions. Updates to applications and firmware can cause additional compatibility issues.

It is with respect to these and other considerations that the disclosure made herein is presented.

SUMMARY

Technologies are described herein for systems and methods for utilization of firmware specific data through an Advanced Configuration and Power Interface (ACPI) Firmware Identification (FID) table. Through an implementation of the technologies disclosed herein, the functionality provided by an application can be restricted based upon firmware specific information contained in the table. Restricting functionality of an application can ensure that the application is compatible with the firmware. By ensuring compatibility between the firmware and an application, the reliability of both the application and the computer running the application are improved.

According to one configuration presented herein, an ACPI table is constructed in a memory of a computing system during boot time that contains firmware specific information. Following the boot process, a request to execute an application can be received such as, for instance, by an operating system. In response to receiving such a request, the firmware specific information is accessed from the ACPI table. The functionality provided by the application can then be restricted based upon the firmware specific information contained in the ACPI table.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
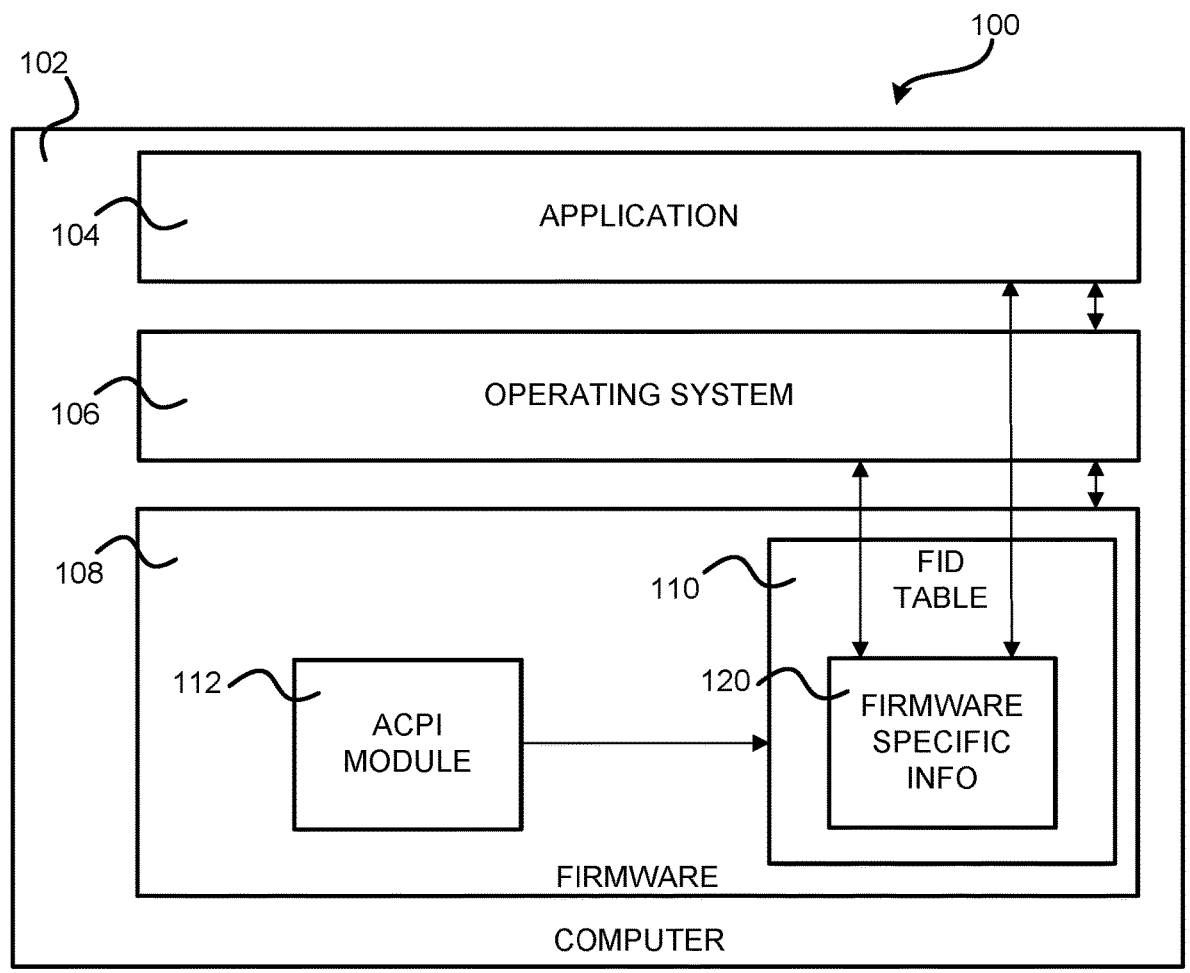
FIG. 1 is a computer architecture diagram illustrating a software architecture utilized by a computer capable of providing firmware specific information to an operating system and applications, according to one or more configurations presented herein.

The following detailed description is directed to technologies for providing firmware specific information to an OS or application via Advanced Configuration and Power Interface (ACPI) tables. Utilizing an implementation of the disclosed technologies, the firmware of a computer can create ACPI tables in order to pass data to an operating system (OS) and applications. An ACPI table may provide the OS with information concerning computer hardware discovery, configuration, power management and monitoring. For example, an ACPI table may provide the OS with information for use in minimizing power consumption.

The passed data can include firmware specific information such as, but not limited to, global unique identifiers (GUID), a date or timestamp indicating when the firmware was built (i.e. created), version numbers of the firmware, data indicating the size of the firmware, and/or firmware tags, among other information. Any of this information can be utilized to restrict functionality of an application. Additionally, the information can be utilized by the application to ensure the firmware supports features, including interactive features, required by the application.

The disclosure presented herein provides methods, systems, apparatuses, and computer-readable media for providing firmware specific information via ACPI tables. In the following detailed description, references are made to the accompanying drawings that form a part hereof, and in which are shown by way of illustration specific configurations or examples. Referring now to the drawings, in which like numerals represent like elements throughout the several figures, aspects of several configurations disclosed herein will be described.

FIG. 1 is a computer architecture 100 diagram illustrating a software architecture utilized by a computer 102 capable of providing firmware specific information to an operating system and applications, according to one or more configurations presented herein. The computer 102 includes an OS 106, an application 104 and a firmware 108. Some examples of firmware 108 include Basic Input/Output System (BIOS), firmware that is compatible with the Unified Extensible Firmware Interface (UEFI), Extensible Firmware Interface (EFI), or Open Firmware among others. The application 104 can include manufacturing tools used to interact with the firmware 108. Other types of applications are also possible.

Firmware 108 includes an ACPI module 112, the module performs tasks such as constructing ACPI tables. The ACPI module 112 can construct numerous ACPI tables, including a Firmware Identification table (which might be referred to herein as the FID table or the FIDT) 110. The FID table 110 contains firmware specific information 120. The firmware specific information 120 contains information that is specific to the firmware 108. The firmware specific information 120 can be shared with the OS 106 to identify the location of FID table 110.

The firmware specific information 120 can include GUIDs, firmware build timestamps, firmware version numbers, firmware size and firmware names or tags. Firmware specific information 120 can also include additional or other types of information. As will be described in greater detail below, the firmware specific information 120 can be utilized by the OS 106 and/or the application 104 to restrict functionality provided by the application 104. Table 1 below provides an example definition for FID table 110.

Fields in Table 1 include the FirmwareID field and the StructVersion field. The FirmwareID field provides an identification field for the FID table 110. Table 1, lists the FirmwareID field as "$FID". The StructVersion field is the version of the FID table 110.

The Size field lists the size of the FID table 110, in bytes. The BiosTag field in Table 1 provides a human readable BIOS identification utilizing an eight-character field. The BiosTag field can be utilized to distinguish a particular project for the computer 102. The FirmwareGuid field identifies the Firmware GUID for the firmware 108. The FirmwareGuid field provides a programmatical way to uniquely identify the BIOS.

Fields such as CoreMajorVersion, CoreMinorVersion, ProjectMajorVersion and ProjectMinorVersion identify the particular version of the firmware 108. Additionally in Table 1, fields such as Year, Month, Day, Hour, Minute and Second provide information of when the firmware build was created.

TABLE 1

Example FID table definition

Name

Firmware_Version Fields

| Type | Parameter Name | Description |
|---|---|---|
| CHAR8 | "FirmwareID[4]" | Signature '$FID' |
| UINT8 | StructVersion | Version of the Firmware_Version Structure |
| UINT16 | Size | Size of this structure |
| CHAR8 | "BiosTag[9]" | BIOS Tag |
| EFI_GUID | FirmwareGuid | Firmware GUID |
| CHAR8 | "CoreMajorVersion[3]" | Core Major Version |
| CHAR8 | "CoreMinorVersion[3]" | Core Minor Version |
| CHAR8 | "ProjectMajorVersion[3]" | Project Major Version |
| CHAR8 | "ProjectMinorVersion[3]" | Project Minor Version |
| UINT16 | Year | Build Year |
| UINT8 | Month | Build Month |
| UINT8 | Day | Build Day |
| UINT8 | Hour | Build Hour |
| UINT8 | Minute | Build Minute |
| UINT8 | Second | Build Second |

Description: This data structure is used to provide information about the current BIOS.
Notes:

Restricting functionality provided by the application 104 based upon the firmware specific information 120 can ensure compatibility between the application 104 and the firmware 108. Compatibility can be achieved, for example, by permitting execution of the application 104 only on computers having a specific firmware version or other type of firmware specific information 120. Alternatively, certain features provided by the application 104 can be disabled, removed, or modified based upon the firmware specific information 120. Additional details regarding the restriction of functionality provided by the application 104 based upon the firmware specific information 120 are provided below with reference to FIGS. 2 and 3.

Figure 2:
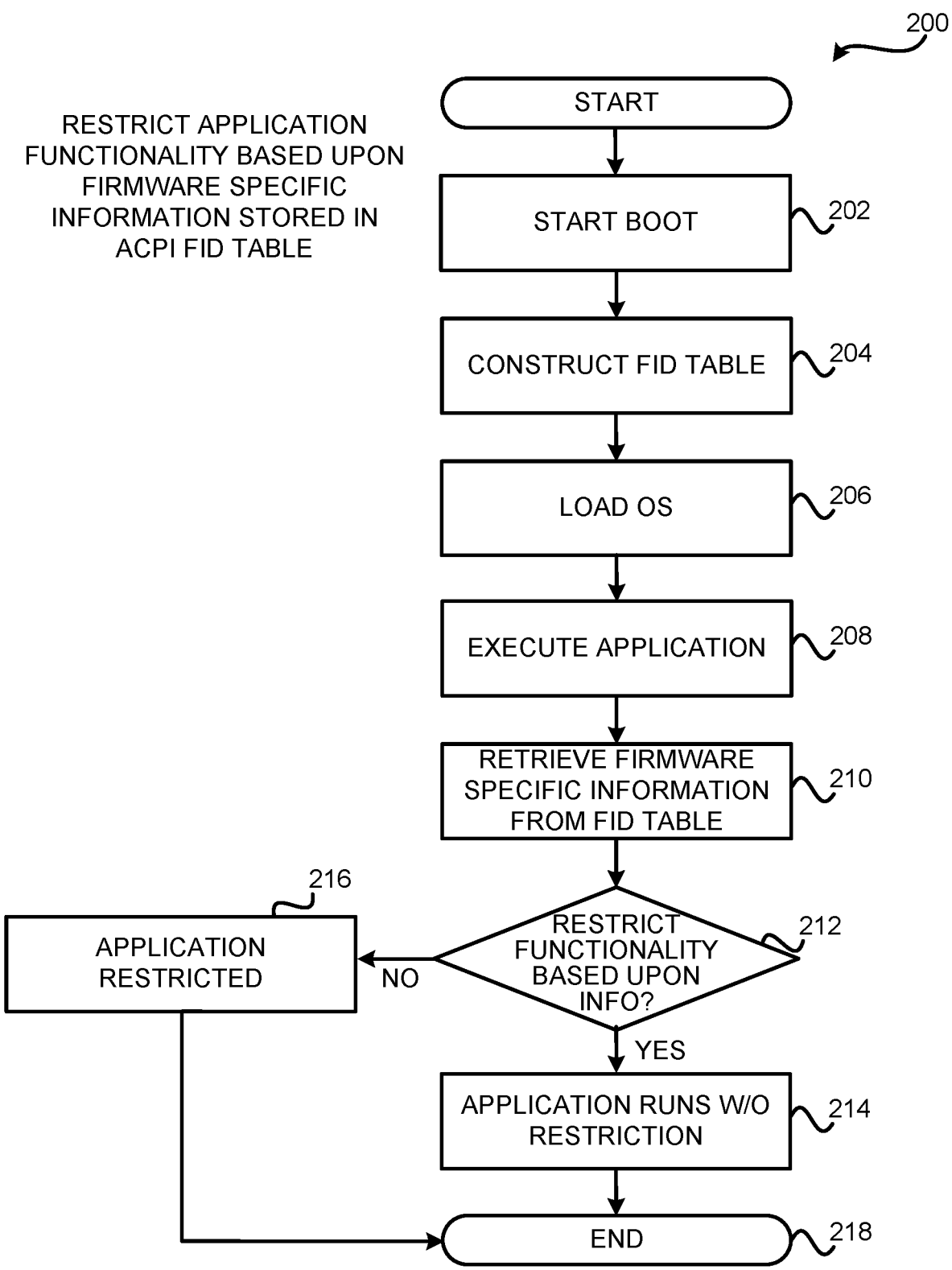
FIG. 2 is a flow diagram showing aspects of a routine for restricting application functionality based upon firmware specific information stored in an ACPI FID table, in one configuration presented herein.

FIG. 2 is a flow diagram showing aspects of a routine 200 for restricting functionality of the application 104 based upon the firmware specific information 120 stored in the ACPI FID 110 table, in one configuration presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the figures and described herein. These operations can also be performed in parallel, or in a different order than those described herein.

The routine 200 begins at operation 202 where booting of the computer 102 can be initiated, thereby beginning execution of one or more portions of the firmware 108. From operation 202, the routine 200 continues to operation 204, where the firmware 108 constructs the FID table 110. As discussed previously, the FID table 110 contains the firmware specific information 120. Although the routine 200 as illustrated and described utilizes the FID table 110, it is contemplated that other ACPI tables could be utilized in other configurations to store the firmware specific information 120 and to restrict the functionality of the application 104.

Figure 4:
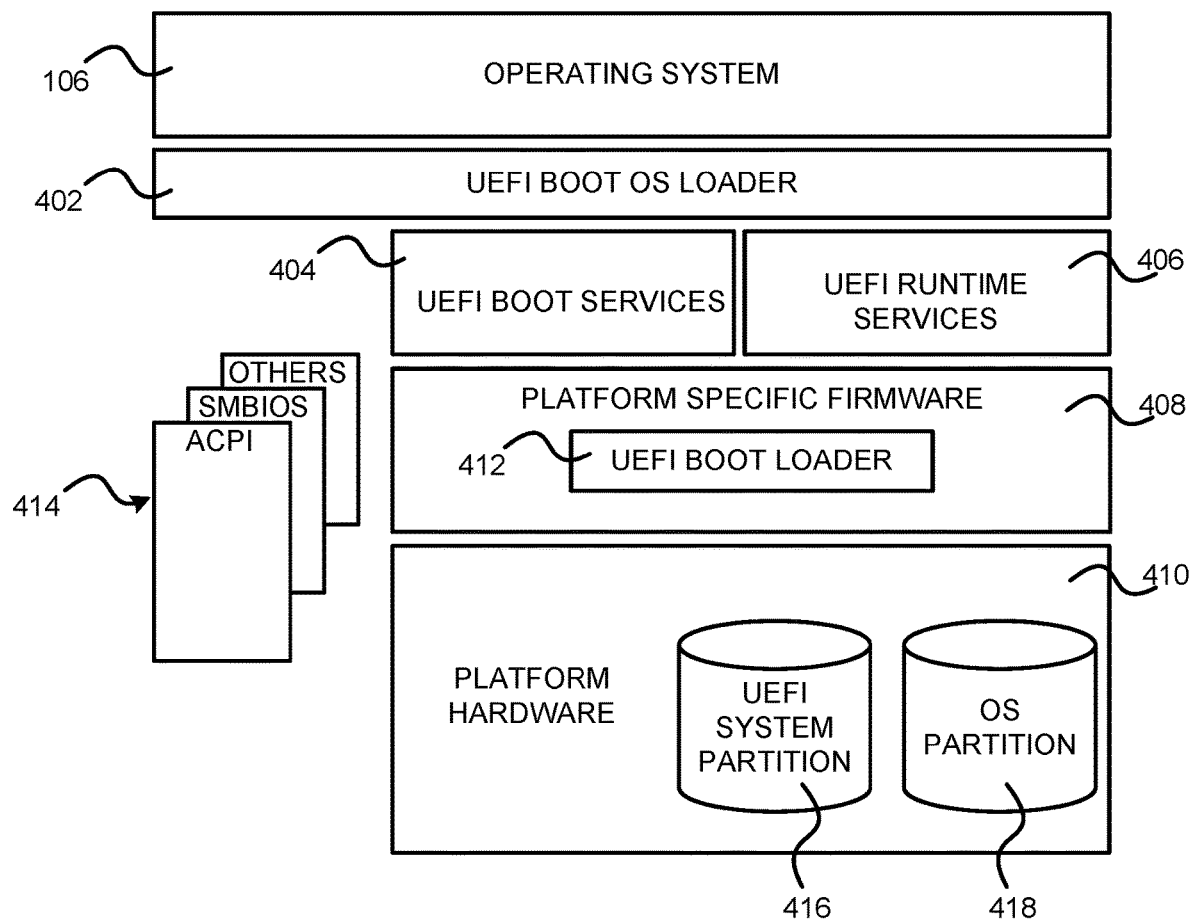
FIG. 4 is a software architecture diagram illustrating an architecture for a Unified Extensible Firmware Interface (UEFI) firmware that provides an operating environment for the technologies presented herein.

From operation 204, the routine 200 continues to operation 206, where the firmware 108 boots the OS 106. During the boot process, ACPI tables, including the FID table 110, are exposed to the OS 106 and the application 104. FIG. 4, discussed below, further describes the loading of the OS 106.

From operation 206, routine 200 continues to operation 208, where the OS 106 executes the application 104. As discussed above, the application 104 can be any of a number of applications. In some configurations, the application 104 is a manufacturing tool used to interact with firmware 108. A manufacturing tool can include a firmware configuration or update program, a setup control environment, or a flash utility, among other types of applications.

After operation 208, the routine 200 continues to operation 210, where the OS 106 retrieves firmware specific information 120 from the FID table 110. The firmware specific information 120 can then be used to restrict functionality provided by the application 104 at operation 212. Functionality can be restricted in a variety of different ways. For example, if the firmware build of firmware 108 is older than a year or another time period, then the application 104 can be restricted. As another example, the application 104 can be restricted if the firmware build major version is not at least at certain release level. Other restrictions are also possible, such as restricting functionality provided by the application 104 based upon the firmware GUID in the FID table 110.

If, at operation 212, the application 104 determines that no restriction is necessary, then routine 200 continues to operation 214. At operation 214, the application 104 is executed without any restrictions on the functionality that it provides. The application 104 can run without restriction since compatibility between the firmware 108 and the application 104 has been verified. Without such compatibility, the application 104 could incorrectly read and write values during execution since the application 104 might be unaware of which version of the firmware 108 that it is interfacing with. The compatibility of the application 104 with the firmware 108 can also avoid potential security issues. This compatibility also can allow easier distribution of the application 104. For example, a manufacturing tool application can be distributed without compatibility worries that the application can be utilized with versions of the firmware 108 it was not intended to be used with.

After operation 214, the routine 200 continues to operation 218, where it ends. If, however, operation 212 the application 104 determines that restriction is necessary, then routine 200 continues from operation 212 to operation 216.

At operation 216, functionality provided by the application 104 is restricted. Restriction of the application 104 can cause the application 104 to cease execution. Alternatively, the restriction can block a feature or a set of features from being provided by the application 104, while the application 104 continues to execute. After operation 216, the routine 200 continues to operation 218, where it ends.

The routine 200 illustrates that the application 104 executes, at least initially. In another configuration, the OS 106 can implement this functionality so that the application 104 never executes if the firmware specific information 120 is not compatible with the application 104.

Figure 3:
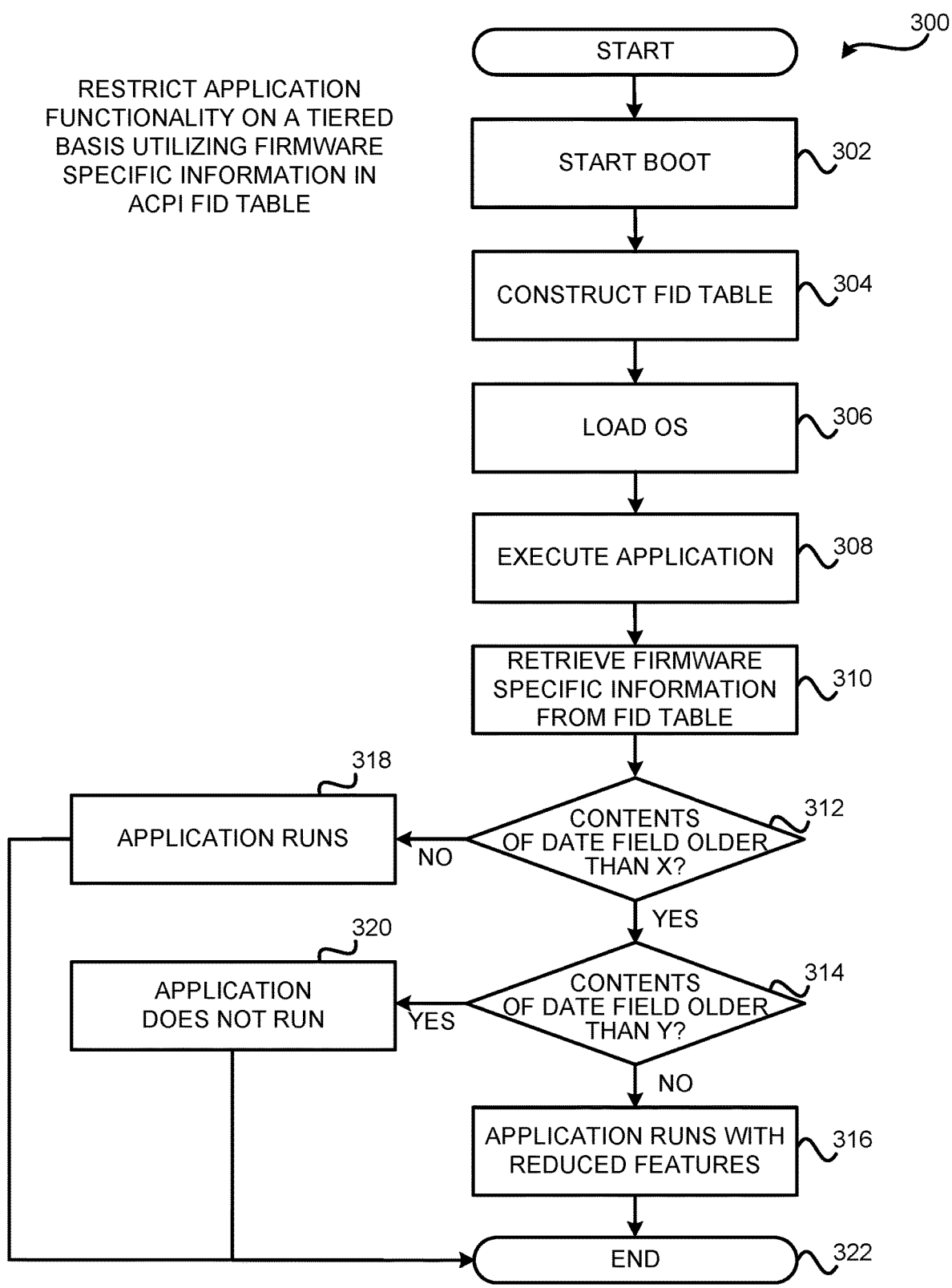
FIG. 3 is a flow diagram showing aspects of a routine for restricting application functionality on a tiered basis utilizing firmware specific information stored in an ACPI FID table, according to one configuration presented herein.

Turning now to FIG. 3, a flow diagram showing aspects of a routine 300 for restricting the functionality of an application 104 on a tiered basis utilizing firmware specific information 120 stored in an ACPI FID 110 table according to one configuration disclosed herein will be described. The routine 300 begins at operation 302, where the computer 102 is booted, thereby beginning execution of one or more portions of the firmware 108.

From operation 302, the routine 300 continues to operation 304, where the firmware 108 constructs the FID table 110. As discussed previously, the FID table 110 contains the firmware specific information 120. After operation 304, the routine 300 continues to operation 306, where the computer 102 loads the OS 106. During the boot process, the FID table 110 is exposed to the OS 106 and the application 104. FIG. 4, discussed below, further describes loading of the OS 106.

From operation 306, routine 300 continues to operation 308, where the application 104 is executed. As discussed above, the application 104 can be any of a number of applications. After operation 308, the routine 300 continues to operation 310, where the OS 106 retrieves the firmware specific information 120 from the FID table 110.

In the configuration shown in FIG. 3, restrictions on the functionality provided by the application 102 are implemented on a tiered basis. For example, at operation 312, the application 104 evaluates the contents of a date field in the firmware specific information 120. If the contents of the date field are not older than a value X, which could be six months as an example, then routine 300 continues to operation 318 where the application 104 is executed. The application 104 can be executed without restriction since compatibility between the firmware 108 and the application 104 has been verified. From operation 318, the routine 300 continues to operation 322, where it ends.

If, at operation 312, the application 104 determines that the date field in FID table 110 is older than X, then routine 300 continues to operation 314. The application 104 evaluates, at operation 314, to determine if the date field in FID table 110 is older than a value Y. The value Y is older than the value X. If the date field is not older than Y, which could be twelve months as an example, then routine 300 continues to operation 316, where the application 104 runs with limiting the features that it provides. At operation 316, the application 104 can run with either a feature, or features, being restricted. From operation 316, the routine 300 continues to operation 322, where it 300 ends.

If, at operation 314, the application 104 determines that the date field in FID table 110 is older than Y, then the routine 300 continues to operation 320. The application 104 is restricted from further execution at operation 320. From operation 320, the routine 300 continues to operation 322, where it ends.

It is to be appreciated that while the routine 300 illustrates two tiers of restriction of the application 104, greater or fewer tiers of restriction of the application 104 are also possible. Additionally, although routine 300 highlights utilizing a date to determine tiered restrictions, other types of information can also be utilized to implement a tiered restriction of the functionality provided by the application 102. For example, the release version of the firmware 108 could be utilized with restrictions accelerating for differences in major releases as opposed to minor releases. Differences in minor release versions could cause the application 104 to execute with a feature, or features, restricted. Conversely, differences in major release versions could cause the application 104 to be restricted from executing.

Turning now to FIG. 4, a software architecture diagram illustrating a UEFI firmware that provides an operating environment for the technologies presented herein. FIG. 4 and the following discussion provide a general description of a suitable computing environment in which configurations presented herein can be implemented. It should be appreciated that although the configurations described herein are discussed in the context of a conventional desktop or server computer, the configurations can be utilized with virtually any type of computing device. While the configurations presented herein are described in the general context of program modules that execute in conjunction with the execution of a computer firmware, those skilled in the art will recognize that various configurations can also be implemented in combination with other program modules. The various disclosed configurations are not limited to UEFI firmware. The disclosed mechanism can be utilized with any firmware that implements ACPI.

As shown in FIG. 4, the architecture can include platform hardware 410 and an OS, such as the OS 106. The platform specific firmware 408 can retrieve an OS image from the UEFI system partition 416 using a UEFI boot loader OS Loader (OS boot loader) 402. The OS boot loader 402 can retrieve an OS image from the OS partition 418.

Once started, the OS boot loader 402 can continue to boot the complete OS 106. In doing so, the OS boot loader 402 can use UEFI boot services 404, UEFI runtime services 406, and an interface to other supported specifications to survey, comprehend, and initialize the various platform components and the OS software that manages them. Thus, interfaces 414 from other specifications can also be present on the system. For example, the ACPI and the System Management BIOS (SMBIOS) specifications can be supported, among other interfaces.

UEFI boot services 404 can provide interfaces for devices and system functionality used during boot time. UEFI runtime services 406 can also be available to the UEFI boot loader 412 during the boot phase. For example, a set of runtime services can be presented to ensure appropriate abstraction of base platform hardware resources used by the OS 106 during its operation. UEFI allows extension of platform firmware by loading UEFI driver and UEFI application images which, when loaded, have access to UEFI-defined runtime and boot services. Various program modules can provide the boot-time and run-time services.

Figure 5:
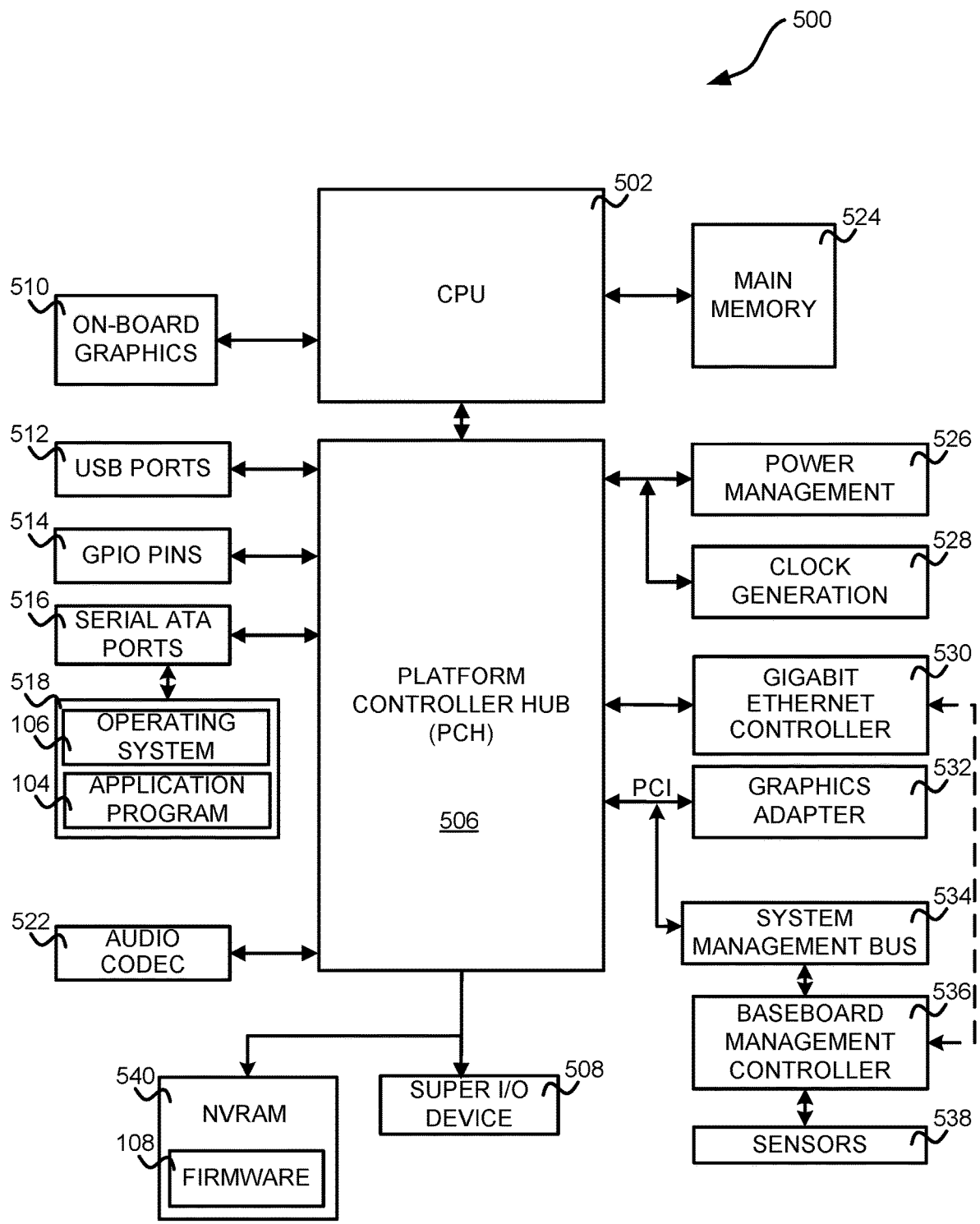
FIG. 5 is a computer architecture diagram that illustrates various components of a computer that can provide an illustrative operating environment for the technologies disclosed herein.

Referring now to FIG. 5, a computer architecture diagram that illustrates various components of a computer that can provide an illustrative operative environment for the technologies presented herein will be described. FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 500 that can be utilized in the implementations described herein. The illustrative computer architecture shown in FIG. 5 is for the computer 500 that includes a baseboard, or "motherboard", which is a printed circuit board to which a multitude of components or devices can be connected by way of a system bus or other electrical communication path. In one illustrative configuration, a central processing unit (CPU) 502 operates in conjunction with a Platform Controller Hub (PCH) 506. The CPU 502 is a central processor that performs arithmetic and logical operations necessary for the operation of the computer 500. The computer 500 can include a multitude of CPUs 502. Each CPU 502 might include multiple processing cores.

The CPU 502 provides an interface to a random access memory (RAM) used as the main memory 524 in the computer 500 and, possibly, to an on-board graphics adapter 532. The PCH 506 provides an interface between the CPU 502 and the remainder of the computer 500.

The PCH 506 can also be responsible for controlling many of the input/output functions of the computer 500. In particular, the PCH 506 can provide one or more universal serial bus (USB) ports 512, an audio codec 522, a Gigabit Ethernet Controller 530, and one or more general purpose input/output (GPIO) pins 514. The USB ports 512 can include USB 2.0 ports, USB 3.0 ports and USB 3.1 ports among other USB ports. The audio codec 522 can include Intel High Definition Audio, Audio Codec '97 (AC'97) and Dolby TrueHD among others.

The PCH 506 can also include functionality for providing networking functionality through a Gigabit Ethernet Controller 530. The Gigabit Ethernet Controller 530 is capable of connecting the computer 500 to another computer via a network. Connections which can be made by the Gigabit Ethernet Controller 530 can include LAN or WAN connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a PCI bus. The PCI bus can include a Peripheral Component Interconnect (PCI) bus, a Peripheral Component Interconnect eXtended (PCI-X) bus and a Peripheral Component Interconnect Express (PCIe) bus among others.

The PCH 506 can also provide a system management bus 534 for use in managing the various components of the computer 500. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 500. For instance, according to a configuration, the PCH 506 includes a serial advanced technology attachment (SATA) adapter for providing one or more serial ATA ports 516. The serial ATA ports 516 can be connected to one or more mass storage devices storing an OS, such as OS 106 and application programs 104, such as a SATA disk drive 518. As known to those skilled in the art, an OS comprises a set of programs that control operations of a computer and allocation of resources. An application program 104 is software that runs on top of the operating system software 106, or other runtime environment, and uses computer resources to perform application specific tasks desired by the user.

According to one configuration of the invention, the OS 106 comprises the LINUX operating system. According to another configuration of the invention the OS 106 comprises the WINDOWS operating system from MICROSOFT CORPORATION. According to another configuration, the OS 106 comprises the UNIX operating system. It should be appreciated that other operating systems can also be utilized.

The mass storage devices connected to the PCH 506, and their associated computer-readable storage media, provide non-volatile storage for the computer 500. Although the description of computer-readable storage media contained herein refers to a mass storage device, such as a hard disk or CD-ROM drive, it should be appreciated by those skilled in the art that computer-readable storage media can be any available media that can be accessed by the computer 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 500.

A low pin count (LPC) interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 540 for storing firmware 108 that includes program code containing the basic routines that help to start up the computer 500 and to transfer information between elements within the computer 500. The firmware 108 can utilize a firmware interface such as a BIOS interface, a UEFI, an Open Firmware interface or another interface.

It should be appreciated that the program modules disclosed herein, including the firmware 108, can include software instructions that, when loaded into the CPU 502 and executed, transform a general-purpose computer 500 into a special-purpose computer 500 customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 524 and/or NVRAM 540. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 506 can include a system management bus 534. The system management bus 534 can include a Baseboard Management Controller (BMC) 536. In general, the BMC 536 is a microcontroller that monitors operation of the computer 500. In a more specific configuration, the BMC 536 monitors health-related aspects associated with the computer 500, such as, but not limited to, the temperature of one or more components of the computer 500, speed of rotational components (e.g., spindle motor, CPU fan, etc.) within the computer 500, the voltage across or applied to one or more components within the computer 500, and the available and/or used capacity of memory devices within the computer 500. To accomplish these monitoring functions, the BMC 536 is communicatively connected to one or more components by way of the system management bus 534.

In one configuration, these components include sensor devices 538 for measuring various operating and performance-related parameters within the computer 500. The sensor devices 538 can be either hardware or software based components configured or programmed to measure or detect one or more of the various operating and performance-related parameters.

The BMC 536 functions as the master on the system management bus 534 in most circumstances, but can also function as either a master or a slave in other circumstances. Each of the various components communicatively connected to the BMC 536 by way of the system management bus 534 is addressed using a slave address. The system management bus 534 is used by the BMC 536 to request and/or receive various operating and performance-related parameters from one or more components, which are also communicatively connected to the system management bus 534.

It should be appreciated that the computer 500 can comprise other types of computing devices, including handheld computers, embedded computer systems, personal digital assistants, and other types of computing devices known to those skilled in the art. It is also contemplated that the computer 500 might not include all of the components shown in FIG. 5, can include other components that are not explicitly shown in FIG. 5, or might utilize an architecture completely different than that shown in FIG. 5.

Based on the foregoing, it should be appreciated that technologies for restricting application functionality based upon firmware specific information stored in an ACPI table are presented herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
    executing a firmware of a computing system to perform a boot process for the computing system;
    during execution of the firmware, constructing a table in a memory of the computing system, the table comprising firmware specific information defining attributes of the firmware;
    following performance of the boot process, receiving a request to execute an application;
    responsive to the request, retrieving the firmware specific information from the table; and
    restricting functionality of the application based upon the firmware specific information.

2. The computer-implemented method of claim 1, wherein restricting the functionality of the application comprises:
    restricting the functionality of the application in a first manner responsive to the firmware specific information comprising a first value; and
    restricting the functionality of the application in a second manner responsive to the firmware specific information comprising a second value.

3. The computer-implemented method of claim 1, wherein restricting the functionality of the application comprises restricting use of a feature of the application.

4. The computer-implemented method of claim 1, wherein restricting the functionality of the application comprises preventing the application from executing on the computing system.

5. The computer-implemented method of claim 1, wherein the firmware specific information comprises a version number for the firmware or a date upon which the firmware was built.

6. The computer-implemented method of claim 1, wherein the firmware specific information comprises a firmware global unique identifier (GUID).

7. The computer-implemented method of claim 1, wherein the table comprises an advanced configuration and power interface (ACPI) table.

8. A computer-readable storage medium having computer-executable instructions stored thereupon which, when executed by a computer, cause the computer to:
    execute a firmware of the computer to perform a boot process for the computer;
    during the execution of the firmware, construct an advanced configuration and power interface (ACPI) table in a memory of the computer, the ACPI table comprising firmware specific information defining attributes of the firmware;
    following performance of the boot process, receive a request to execute an application;
    retrieve the firmware specific information from the ACPI table; and
    restrict functionality of the application based upon the firmware specific information.

9. The computer-readable storage medium of claim 8, wherein restricting functionality of the application comprises:
    restricting the functionality of the application in a first manner responsive to the firmware specific information comprising a first value; and
    restricting the functionality of the application in a second manner responsive to the firmware specific information comprising a second value.

10. The computer-readable storage medium of claim 9, wherein the first value and the second value comprise dates and wherein the second value is prior to the first value.

11. The computer-readable storage medium of claim 9, wherein restricting functionality of the application comprises restricting use of a feature of the application.

12. The computer-readable storage medium of claim 9, wherein restricting functionality of the application comprises preventing the application from executing on the computer.

13. The computer-readable storage medium of claim 9, wherein the firmware specific information comprises a firmware global unique identifier (GUID).

14. The computer-readable storage medium of claim 9, wherein the firmware specific information comprises a version number for the firmware or a date upon which the firmware was built.

15. A computer, comprising:
    a processor; and
    a memory communicatively coupled to the processor having a firmware stored thereon that executes in the processor from the memory and which, when executed by the processor, causes the computer to
    perform a boot process for the computer,
    during the execution of the firmware, construct an advanced configuration and power interface (ACPI) table in the memory of the computer, the ACPI table comprising firmware specific information defining attributes of the firmware,
    following performance of the boot process, retrieve the firmware specific information from the ACPI table, and
    restrict functionality of an application based upon the firmware specific information.

16. The computer of claim 15, wherein restricting the functionality of the application comprises:
    restricting the functionality of the application in a first manner responsive to the firmware specific information comprising a first value; and
    restricting the functionality of the application in a first manner responsive to the firmware specific information comprising a second value.

17. The computer of claim 15, wherein restricting the functionality of the application comprises restricting use of a feature of the application.

18. The computer of claim 15, wherein restricting the functionality of the application comprises preventing the application from executing on the computer.

19. The computer of claim 15, wherein the firmware specific information comprises a version number for the firmware or a date upon which the firmware was built.

20. The computer of claim 15, wherein the firmware specific information comprises a firmware global unique identified (GUID).

* * * * *